June 27, 1961 R. A. JOHNSON 2,989,874
ROTARY WORK TABLE WITH DIRT EXCLUDING GEAR MESH CONTROLS
Filed March 23, 1960
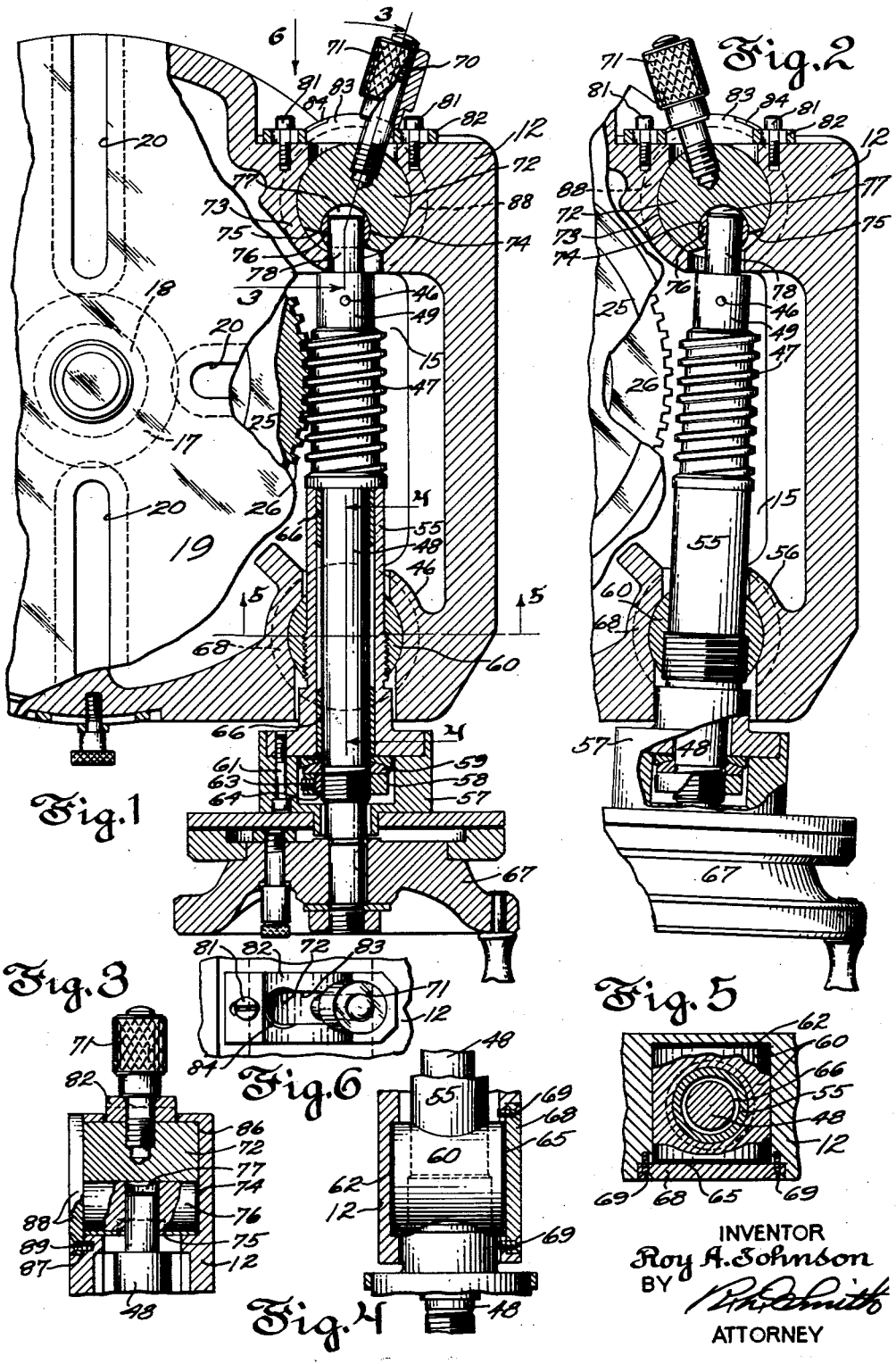
INVENTOR
Roy A. Johnson
BY
ATTORNEY United States Patent Office 2,989,874
Patented June 27, 1961

2,989,874
ROTARY WORK TABLE WITH DIRT EXCLUDING
GEAR MESH CONTROLS
Roy A. Johnson, Easton, Conn., assignor to The Bridgeport Machines, Inc., Bridgeport, Conn., a corporation of Connecticut
Filed Mar. 23, 1960, Ser. No. 17,019
10 Claims. (Cl. 74—405)

This invention relates to improved mechanism for shifting a driving worm into and out of mesh with the gear teeth of a driven worm wheel particularly in a rotary able for holding work pieces while being machined. The improvements involve modification of corresponding parts in such a rotary work table disclosed in United States Patent No. 2,771,169.

An object of the present invention is to improve the sturdiness and durability and the convenience and precision of manual control of such corresponding parts in a rotary work table.

Another object s to avoid dependence on the action of springs for shifting the worm either into or out of mesh with the worm wheel.

Another object is to provide an improved swivel mounting for a swingable jib arm carrying rotor bearings for the shaft of the worm wherein all parts are durable and preferably metallic and there is avoided the use of packing glands of soft compressible material as fillers for excluding entrance of dirt or foreign matter to the interior mechanism at the swivel mounting.

Another object is to provide manually operable means for swinging such jib arm arranged to actuate the latter directly at a maximum distance from its swivel mounting whereby to render more easily sensed and controlled the meshing of the teeth of the worm with the teeth of the worm wheel.

These and other objects of the improvements will appear in fuller detail from the following description of a preferred embodiment of the invention having reference to the appended drawings wherein:

FIG. 1 is a fragmentary view of a rotary work table having a face plate whose rotary position is determined and established by worm and worm wheel gearing in which the worm is retractable from the worm wheel to free the face plate for rotary adjustment independently of the worm, parts being shown partially in section on a plane containing the axis of the worm.

FIG. 2 is in part like FIG. 1 showing the jib arm and its rotor bearing for the worm shaft swung to a different angular position that frees the worm wheel from the worm.

FIG. 3 is a view taken in section on the plane 3—3 in FIG. 1, looking in the direction of the arrows.

FIG. 4 is a view taken in section on the plane 4—4 in FIG. 1, looking in the direction of the arrows.

FIG. 5 is a view taken in section on the plane 5—5 in FIG. 1, looking in the direction of the arrows.

FIG. 6 is a fragmentary elevation looking at the worm meshing control handle in the direction of arrow 6 in FIG. 1.

The shallow base 12 of the work table is a hollow casting that forms a dirt excluding casing that houses a gear chamber 15. Base 12 incorporates a central, vertical rotor bearing 17 in which is journaled the depending trunnion 18 of the conventional rotary faceplate 19 having inverted T-shaped grooves 20 to receive the heads of bolts (not shown) adapted to clamp work pieces fixedly against the surface of the faceplate in usual manner.

Secured fixedly to faceplate 19 is a depending annulus or ring flange 25 on whose periphery are the gear teeth 26 of the driven worm wheel. 47 is the driving worm which on occasion meshes with worm wheel 26 and shares therewith the space in chamber 15 of the base 12. The hub 49 of worm 47 is fixed on a shaft 48 by pin 46, said shaft being swingable laterally so that the worm can be shifted bodily into and out of mesh with worm wheel 26 through the ability of the shaft carrying jib arm 55 to swivel about a vertical shaft tilting axis in a bearing 56 in frame 12.

The jib arm is mounted to thus swivel by means of a cylindrical trunnion block 60 of sufficiently large girth to contain a cross hole through which the jib arm extends and whose vertical axis intersects the horizontal axis of worm shaft 48.

The trunnion block 60 is internally screw threaded in a part of the length of the cross hole for screw thread engagement with an externally threaded length of the jib arm. The main length of trunnion block 60 is journaled in bearing 56 and its top end as shown in FIG. 4 is rotatably nested in a shallow, thrust affording bearing recess 62 in a wall of base 12 that overlies the jib arm. The opposite end of trunnion block 60 is journaled in an open aperture 65 in a wall of base 12 that underlies the jib arm. A thrust affording cover 68 is removably secured by screws 69 in a counterbore in aperture 65. This gives the trunnion block room to be inserted or removed from bearing 56 for assembling or disassembling the parts with jib arm removed.

On the outer end of jib arm 55, outside of base 12, a cap 57 is secured on the jib arm by screws 61. Cap 57 houses a thrust washer 59 and retaining nut 58 threaded onto shaft 48 and locked by a set screw 63 which thrusts against a soft metal plug 64 that binds against the shaft threads without damaging them. Thrust limiting axial movement of shaft 88 in the opposite or outward direction is afforded by contact between the end of worm 47 and the inner end of the jib arm 55. Sleeve bearings 66 for shaft 48 are fixedly lodged in the central bore of jib arm 55.

Sufficient clearance space is provided between the overall girth of the jib arm and the walls of base 12 that adjoin the frame bearing 56 to permit the few degrees of swinging movement performed by the jib arm between its positions shown in FIGS. 1 and 2.

On its outer end, shaft 48 carries keyed thereto a wheel handle 67 which in the aforesaid U.S. Patent No. 2,771,169 is made use of for both turning shaft 48 and swinging the jib arm 55 to and from a position to mesh the worm 47 with the worm wheel 26. The present improvements provide a special kind of separate shifter handle 71 for so swinging the jib arm.

Shifter handle 71 projects radially from a cylindrical rocker block 72 in which it is removably mounted, the main length of which block is journaled to swing about a vertical axis in a swivel bearing 73 in the base casting 12. The top end of rocker block 72 as shown in FIG. 3 is rotatably nested in a shallow bearing recess 86 in a wall of base 12 that overlies the rocker block. The opposite end of the rocker block is journaled in an open aperture 87 in a wall of base 12 that underlies the rocker block. A thrust affording cover 88 is removably secured by screws 89 in a counterbore in aperture 87. This gives the rocker block room to be inserted or removed from bearing 73 for assembling or disassembling the parts with the worm shaft 78 removed.

A bearing hole 74 is bored in rocker block 72 parallel with and eccentric to the axis of the latter which hole is intersected by a relatively narrow segmental flatted surface of block 72 having the vertical width indicated in FIG. 3 machined across the rocker block so as to remove less than half of the circumference of hole 74 and yet give said hole full lateral exposure to the chamber 15 in the base casting 12 and permit the rocker block to straddle the end of the shaft. A cylindrical hinge pin 76 is free to swivel in hole 74 and contains a cross hole 77 which rotatably and slidably receives the reduced end portion 78 of worm shaft 48. Sufficient clearance space is provided between the reduced end portion 78 of shaft 48 and the wall of base 12 that adjoins the frame bearing 73 to permit the small range of lateral swinging movement performed by the jib arm 55 between its positions shown in FIGS. 1 and 2.

In operation the face plate 19 can be rotated by wheel handle 67 or can be kept from turning by the meshing of worm 47 with worm wheel 26 as shown in FIG. 1. The mesh can be maintained by screwing down the knurled thumb nut 71 on the threads of its shank 70 until it binds against the outer arcuate edges of the aperture 83 in guard plate 82 in which the shank swings.

Upon release of the shifter handle by a slight unscrewing of thumb nut 71 the parts can be swung to their unmeshing positions shown in FIG. 2 in which positions the parts can be stayed by again tightening down the thumb nut 71 against guard plate 82. Upon next meshing the worm with the worm wheel by returning shifter handle 71 to its position in FIG. 1 there is positive control of the swinging of the worm toward the worm wheel and there can be accurately sensed by touch the admission or non-admission of the gear teeth into mesh so that practically no hammer blow needs take place such as could occur if the jib arm 55 were to be swung solely by lateral thrust exerted on the wheel handle 67 at its relatively short leverage distance from swivel bearing 46. A chamfer 84 of U-shaped extent at each of the rounded ends of arcuate aperture 83 affords a retaining detent in which the inner tapered end of thumb nut 71 seats to prevent accidental dislodgement of the shifter handle from either of its limit positions of throw when the nut is screwed down on its shank.

The appended claims are directed to and intended to cover all mechanically obvious equivalents for the parts and their operative relationship that are herein illustrated and described to teach a successful embodiment of the invention.

I claim:

1. Dirt excluding mechanism for throwing into and out of mesh a bodily shiftable gear and a mating gear with sensitive detection of gear tooth interference, comprising in combination with the mating gear and shiftable gear, framework for the mechanism including a dirt excluding casing housing said gears, a shaft carrying said shiftable gear, means pivotally mounting said shaft on said framework in a manner to be swung about an axis of tilting movement in directions to move said shiftable gear into and out of mesh with said mating gear, handle means adapted to rotate said shaft on its lengthwise axis fixed to said shaft so as to swing in unison with the tilting thereof outside of said housing, and a gear shifter pivotally mounted on said framework in dirt excluding relation to said casing in a manner to perform oscillatory movement relative to said shaft about an axis remote from said axis of tilting movement while operatively engaged with an end of said shaft inside of said casing.

2. Dirt excluding mechanism as defined in claim 1, in which the said pivotal mounting means for the said shaft comprises a cylindrical block journaled with dirt excluding fit in the said framework through and crosswise of which block the said shaft extends with dirt excluding fit.

3. Dirt excluding mechanism as defined in claim 1, in which the said gear shifter comprises a member mounted for reciprocal rotary movement in the said framework about an axis perpendicularly intersecting the axis of gear rotating movement of the said shaft.

4. Dirt excluding mechanism for rapidly throwing into and out of mesh a concealed bodily shiftable gear and a mating gear with sensitive detection of gear tooth interference, comprising in combination with the mating gear and shiftable gear, framework for the mechanism, a shaft carrying said shiftable gear, handle means for rotating said shaft, means pivotally mounting said shaft on said framework in a manner to be swingable about a pivotal axis in a path to move said shiftable gear bodily toward and away from said mating gear, and a gear shifter comprising a fork-shaped member straddling an end of the said shaft and mounted for reciprocative movement on said framework at a distance from said axis in a manner to swing said shaft in said path.

5. Dirt excluding mechanism for rapidly throwing into and out of mesh a concealed bodily shiftable gear and a mating gear with sensitive detection of gear tooth interference, comprising in combination with the mating gear and shiftable gear, framework for the mechanism, a shaft carrying said shiftable gear, handle means for rotating said shaft, means pivotally mounting said shaft on said framework in a manner to be swingable about a pivotal axis in a path to move said shiftable gear bodily toward and away from said mating gear, and a gear shifter comprising a cylindrical block mounted in said framework to swivel about a shifter axis and containing a recess admissive to an end of said shaft.

6. Dirt excluding mechanism for rapidly throwing into and out of mesh a concealed bodily shiftable gear and a mating gear with sensitive detection of gear tooth interference, comprising in combination with the mating gear and shiftable gear, framework for the mechanism, a shaft carrying said shiftable gear, handle means for rotating said shaft, means pivotally mounting said shaft on said framework in a manner to be swingable about a pivotal axis in a path to move said shiftable gear bodily toward and away from said mating gear, and a gear shifter comprising a cylindrical block mounted in said framework to swivel about a shifter axis and containing a bearing hole parallel with and eccentric to said shifter axis, and a hinge pin having rotary bearing in said hole and containing a cross hole slidably engaged by an end of said shaft whereby to swing said shaft in said path.

7. Dirt excluding mechanism as defined in claim 6, together with a shifter handle projecting radially from the said block of the said gear shifter to swing through an arc of travel in unison with the swiveling movement of said block, and detent means on the said framework at each end of said arc of travel cooperative with said shifter handle to arrest the latter in anchored relation to the said framework.

8. Dirt excluding mechanism as defined in claim 7, together with a locking element carried by the said shifter handle and movable with respect thereto into and out of detentive engagement with the said framework.

9. Dirt excluding mechanism as defined in claim 8, in which the said gear shifter is substantially nearer to the said shiftable gear than is the said crank handle.

10. Dirt excluding mechanism as defined in claim 8, in which the said shiftable gear and the said pivotal axis of said shaft mounting means intervene lengthwise of said shaft between the said gear shifter and the said crank handle.

References Cited in the file of this patent

UNITED STATES PATENTS

| 925,710 | Leavitt | June 22, 1909 |
| 1,000,084 | Frederickson | Aug. 8, 1911 |
| 1,072,282 | Waninger | Sept. 2, 1913 |
| 1,327,129 | Wolff | Jan. 6, 1920 |
| 1,591,316 | Iglaver | July 6, 1926 |
| 2,138,937 | Petroe | Dec. 6, 1938 |
| 2,748,617 | Deibel | June 5, 1956 |
| 2,748,624 | Costello | June 5, 1956 |
| 2,771,169 | Wahlstrom | Nov. 20, 1956 |

FOREIGN PATENTS

| 653,091 | Germany | Nov. 15, 1937 |
| 764,705 | Great Britain | Jan. 2, 1957 |
| 915,656 | Germany | July 26, 1954 |